US009229129B2

(12) United States Patent
Wu

(10) Patent No.: US 9,229,129 B2
(45) Date of Patent: Jan. 5, 2016

(54) RESERVOIR GEOBODY CALCULATION

(75) Inventor: Jianbing Wu, Anchorage, AK (US)

(73) Assignee: ConocoPhillips Company, Houston, TX (US)

( * ) Notice: Subject to any disclaimer, the term of this patent is extended or adjusted under 35 U.S.C. 154(b) by 353 days.

(21) Appl. No.: 13/275,421

(22) Filed: Oct. 18, 2011

(65) Prior Publication Data

US 2012/0150501 A1  Jun. 14, 2012

Related U.S. Application Data

(60) Provisional application No. 61/422,031, filed on Dec. 10, 2010.

(51) Int. Cl.
*G06G 7/48* (2006.01)
*G01V 99/00* (2009.01)

(52) U.S. Cl.
CPC .......... *G01V 99/005* (2013.01); *G01V 2210/64* (2013.01); *G01V 2210/644* (2013.01)

(58) Field of Classification Search
CPC ......... G06F 17/00; G06F 17/10; G06F 19/00; G06F 7/00; G06G 7/48; G06G 7/57; G06T 15/00; G06Q 50/00
See application file for complete search history.

(56) References Cited

U.S. PATENT DOCUMENTS

| | | | |
|---|---|---|---|
| 5,757,663 A * | 5/1998 | Lo et al. | 702/6 |
| 6,549,879 B1 * | 4/2003 | Cullick et al. | 703/10 |
| 6,618,678 B1 | 9/2003 | Van Riel | |
| 6,690,820 B2 | 2/2004 | Lees et al. | |
| 7,006,085 B1 | 2/2006 | Acosta et al. | |
| 7,079,953 B2 | 7/2006 | Thorne et al. | |
| 7,113,869 B2 | 9/2006 | Xue | |
| 2004/0153247 A1 | 8/2004 | Czernuszenko et al. | |
| 2004/0153298 A1 * | 8/2004 | Colvin et al. | 703/10 |
| 2004/0210394 A1 * | 10/2004 | Trappe et al. | 702/14 |
| 2006/0235666 A1 | 10/2006 | Assa et al. | |
| 2007/0027666 A1 * | 2/2007 | Frankel | 703/10 |

(Continued)

FOREIGN PATENT DOCUMENTS

| | | | |
|---|---|---|---|
| WO | 2007106244 | 9/2007 | |
| WO | WO 2007106244 A2 * | 9/2007 | E21B 47/00 |
| WO | 2008121950 | 10/2008 | |

OTHER PUBLICATIONS

Wikipedia contributors, Collection (abstract data type), Wikipedia, The Free Encyclopedia, Nov. 21, 2009, Web: Nov. 6, 2013.*

(Continued)

*Primary Examiner* — Kandasamy Thangavelu
(74) *Attorney, Agent, or Firm* — ConocoPhillips Company

(57) ABSTRACT

A method for calculating connected productive regions ("geobodies") in a hydrocarbon reservoir uses an algorithm which visits a cell in a geological model of the reservoir, assigning a geobody identifier if the cell possesses certain threshold characteristics and adding the connected neighbors of each visited cell to a data queue or stack. The data queue is emptied cell by cell, each cell popped out of the queue being assigned the same geobody identifier value and having its own connected neighbors added to the queue. Cells are popped out until the queue is empty and then another cell in the model which has not yet been visited is selected. The process continues until all cells have been visited. Cells may also be pre-identified as being part of a well; in this case the algorithm will also establish well connectivity.

10 Claims, 5 Drawing Sheets

(56) References Cited

U.S. PATENT DOCUMENTS

| | | | |
|---|---|---|---|
| 2008/0133192 A1 | 6/2008 | Gallagher et al. | |
| 2008/0154505 A1 | 6/2008 | Kim et al. | |
| 2009/0303233 A1* | 12/2009 | Lin et al. | 345/419 |
| 2010/0114544 A1* | 5/2010 | Dogru | 703/10 |
| 2010/0125349 A1* | 5/2010 | Abasov et al. | 700/90 |
| 2011/0054857 A1* | 3/2011 | Moguchaya | 703/2 |
| 2011/0153300 A1* | 6/2011 | Holl et al. | 703/10 |
| 2012/0215513 A1* | 8/2012 | Branets et al. | 703/10 |
| 2012/0296619 A1* | 11/2012 | Maliassov et al. | 703/10 |

OTHER PUBLICATIONS

J. Hoshen and R. Kopelman, "Percolation and Cluster Distribution. I. Cluster Multiple Labeling Technique and Critical Concentration Algorithm", Physical Review B, vol. 14, No. 8, 1976, pp. 3438-3445.

J. Hoshen, R. Kopelman and E.M. Monberg, "Percolation and Cluster Distribution. II. Layers, Variable-Range Interactions, and Exciton Cluster Model", Journal of Statistical Physics, vol. 19, No. 3, 1978, pp. 219-242.

J. Hoshen, P. Klymko, and R. Kopelman, "Percolation and Cluster Distribution. III. Algorithms for the Site-Bond Problem", Journal of Statistical Physics, vol. 21, No. 5, 1979, pp. 583-600.

Clayton V. Deutsch, "Fortran Programs for Calculating Connectivity of Three-Dimensional Numerical Models and for Ranking Multiple Realizations", Computers & Geosciences, vol. 24, No. 1, pp. 69-76.

Eulogio Pardo-Iguzquiza and Peter A. Dowd, "CONNEC3D: A Computer Program for Connectivity Analysis of 3D Random Set Models", Computers & Geosciences 29 (2003) pp. 775-785.

David K. Larue and Joseph Hovadik, "Connectivity of Channelized Reservoirs: A Modelling Approach", Petroleum Geoscience, vol. 12, 2006, pp. 291-308.

Zulfiquar Reza, Matthew Pranter & Rex Cole, "Fluvial Reservoir Modeling and Connectivity Analyses", CU-Boulder & Mesa State College, 2006, pp. 1-37.

N. Sommer, "ECONN & WCONN Workflow", 2007, pp. 1-11.

Crack Download ShipBuilding CAD/CAM/CAE, Casting, EDA, Optical Software, "Petrel 2008.1—What's New" Schlumberger, Sector Model, May 27, 2008, 1 page.

Joseph M. Hovadik and David K. Larue, "Static Characterizations of Reservoirs: Refining the Concepts of Connectivity and Continuity", Petroleum Geoscience, vol. 13, 2007, pp. 195-211.

* cited by examiner (a) face  (b) edge  (c) point

RESERVOIR GEOBODY CALCULATION

CROSS-REFERENCE TO RELATED APPLICATIONS

This application is a non-provisional application which claims the benefit of and priority to U.S. Provisional Application Ser. No. 61/422,031 filed Dec. 10, 2010, entitled "Reservoir Geobody Calculation," which is hereby incorporated by reference in its entirety.

FIELD OF THE DISCLOSURE

The present disclosure relates generally to methods and apparatus for calculating connected neighbor cells in a geological model of a reservoir of hydrocarbon deposits. The set of connected cells is known as a geobody; an estimated volume within a reservoir within which flow of hydrocarbon deposit may be possible.

BACKGROUND OF THE DISCLOSURE

In three-dimensional (3-d) geological modeling of subterranean hydrocarbon reservoirs, the connected geocellulars or geobodies are of particular interest for reservoir production and performance analysis. For example, where the hydrocarbon deposits are located, where they will flow and what flow rates are possible in different parts of the reservoir could be important for planning where wells should be sunk into the reservoir and how fast the hydrocarbon should be pumped from each well without creating e.g. cavitation problems.

A 3-d geological reservoir model essentially comprises a large number of volume cells (commonly in excess of one million), each associated with a number of physical parameters or seismic attributes. Physical parameters may include for example porosity and permeability; seismic attributes may include e.g. impedance. For some cells of the model the parameters will have been measured directly and for others they will be estimated values. Geobody calculation involves searching the cells of the model, determining based on seismic attributes and/or physical parameters which cells form part of a productive region of the reservoir and then labeling those productive cells which are connected together to make a geobody. Put another way, it can be thought of as the identification of a connected group of cells which are sufficiently capable of supporting hydrocarbon flow that they can be considered together to be a single "pocket" of hydrocarbon deposit.

Various techniques have been described or developed in the past for establishing the geobodies in a reservoir model. The so called "cluster multiple labeling technique" is described in J. Hoshen & R. Kopelman: "Percolation and cluster distribution. I Cluster multiple labeling technique and critical concentration algorithm," Physical Review B, 14 (1976) p. 3438. In this reference, a percolation based algorithm assigns multiple labels to the same cluster found by bonds with a limited neighborhood radius, then removes the redundant labels to obtain a unique label for each cluster. Multiple labeling and removal of redundant labeling make this algorithm costly in terms of central processing unit (CPU) time for a large geological model.

In the article Clayton V. Deutsch: "Fortran programs for calculating connectivity of three dimensional numerical models and for ranking multiple realizations," *Computers & Geosciences*, 24 (1998) p. 69 an algorithm is described which scans the binary indicator values (flags) in a 3 dimensional grid of volume cells in a geological model. The X-stack, Y-stack, and Z-stack are separately and sequentially scanned to locate connected cells and geobody codings applied to connected cells. Duplicated geobody codings are inevitably created, which are removed in subsequent scans. Again, multiple visits to each volume cell and redundant application of geobody identifiers mean that this algorithm would be costly in CPU time for a large geological model. This algorithm is embodied in a program known as geo_obj ("geo-objects")

In U.S. Pat. No. 5,757,663 (Lo and Chu), two methods are proposed to calculate the geobodies connected to well perforated zones. The first is the directional search (also known as the "pacman" method) which propagates from each well-perforated cell and finds all its connected neighbors in a certain direction until there is no further connected neighbor in that direction and then changes to another direction at the last stop location. The second is an iterative search which acts in a similar way to the Deutsch method (see reference above) but once the scan reaches grid boundaries it sweeps the property again in the opposite direction; this process repeats until all X, Y and Z directions are fully scanned. The method uses the well perforation locations as starting points; for this reason, it cannot find those isolated geobodies which are not connected to the current wells. This method also involves repeated visits to each cell, which makes it costly in CPU time.

In practical analysis of hydrocarbon reservoirs, where there are many unknowns, it is normal to work with a large number of alternative realizations of a reservoir model all of which represent possible configurations of the various reservoir parameters. Geobody analysis is needed for each realization. Statistics such as the distribution of geobody size, the reservoir geobody connectivity and reservoir-well connectivity may be calculated for the purpose of ranking the realizations. It is highly desirable to be able to perform geobody analysis without taking up excessive computing resource, to allow analysis of multiple realizations in a realistic time frame using conventional computer hardware.

Commonly used software for calculating geobody information includes the program "geo_obj" (see the Deutsch reference above) and the Petrel® utility function, marketed by Schlumberger Limited. For a one million cell model, using face connection only, the "geo_obj" program takes 82 seconds on an IBM® T40 laptop (1.3 GHz processor and 768 Mbytes of memory). Using the 2008 version of the Petrel® software, the same process takes 46 seconds. For a 50 million cell model using face connection, both "geo_obj" and Petrel® 2008 failed, even using a Dell® desktop computer with 3 GHz processors and 3 GBytes of memory.

SUMMARY OF THE INVENTION

According to one embodiment of the invention, a method for calculating at least one theoretically connected region within a 3-d model is provided, wherein the model comprises a plurality of volume cells each associated with at least one property, the method comprising the steps of:
  a) For each cell of the model, determining whether at least one threshold criterion based on said at least one property is met or not and assigning to the cell a respective met flag or not met flag accordingly;
  b) For a given cell having a met flag, determining its neighboring cells, assigning a geobody identifier value to those of its neighboring cells which have a met flag and storing references for those cells in a temporary store;
  c) Repeating step b) above for any cell whose reference remains in the temporary store until the store is empty;

d) Locating a cell having a met flag and for which step b) has not yet been performed and then performing steps b) and c) for that cell, assigning to it an incremented geobody identifier value;

e) Repeating step d) until all cells in the model which have a met flag have been assigned a geobody identifier value.

In the embodiments described here, said at least one connected region is a geobody and said model represents a subterranean hydrocarbon reservoir.

Said temporary store may have a queue data structure or a stack data structure.

The 3-d model may have any type of grid structure. For example, it may comprise a Cartesian grid of volume cells or a corner point grid or even an unstructured grid. Step (b) of the method may be performed using a neighborhood window function to determine which cells are neighboring. Using the method of the invention, it is possible to ensure that a geobody identifier value is assigned to each cell only once, unlike the prior art methods.

It is possible to perform a geobody calculation using the method of the invention, using no data other than the coordinates of the volume cells to take into account geobodies which abut a boundary of the model.

Often, the model may include a well and one or more cells of said model may be perforated by said well; in this case, the method may further comprise assigning a first unique well identifier to said cell or cells which are perforated by said well and determining which geobodies are connected to said well.

The model may include at least one further well and one or more cells may be perforated by said at least one further well; in this case, the method may comprise assigning one or more further unique well identifiers to said further well or wells and determining wells which are connected together via geobodies.

The method according to the invention may be embodied in a computer program. The computer program may of course be stored on any computer readable media, such as a magnetic or optical disc or flash memory, etc. The optional features described above, and combinations of them, are of course equally applicable to the computer program and to the computer program stored on computer readable media.

DETAILED DESCRIPTION

In general, an indicator value or flag is first generated for each volume cell to represent whether the cell is capable of being considered as part of a productive region (geobody). This analysis is based on one or more physical parameters or seismic attributes, or a combination, according to some chosen threshold or thresholds; if the threshold criteria are met then a met flag is assigned. The indicator value or flag, which may e.g. simply be a binary number, is then used in the process to identify connected geobodies. If the flag indicates that a cell is capable of being part of a geobody (a met flag) then it is included in the analysis; if the flag indicates that the threshold value has not been met, then the cell is treated as a "background" cell which is not considered to contribute to reservoir production.

Figure 1:
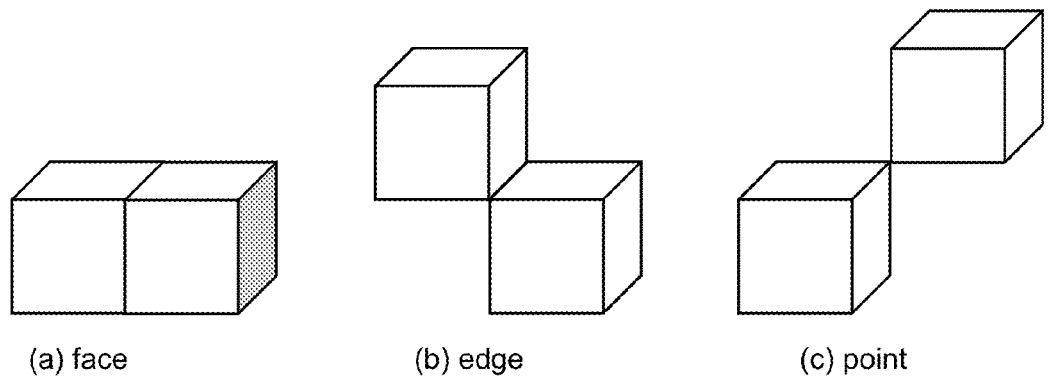
FIG. 1 is a schematic showing the neighbor connection types in a 3-d Cartesian grid.

The next step is to establish which cells are connected. To be connected, two cells must be both neighboring cells and also have a met flag. It must first be decided what constitutes a neighboring cell: for a 3-d Cartesian grid there are three possibilities: face, edge and point (sometimes called corner-point or vertex). Any one or any combination of these may be used, but it is most common to use face only. This is illustrated in FIG. 1a. Once it has been decided what constitutes a pair of neighboring cells, any two neighboring cells will be deemed to be connected (and therefore part of the same geobody) if they both have a met flag (i.e. they are not part of the background of non-productive cells).

Figure 2A:
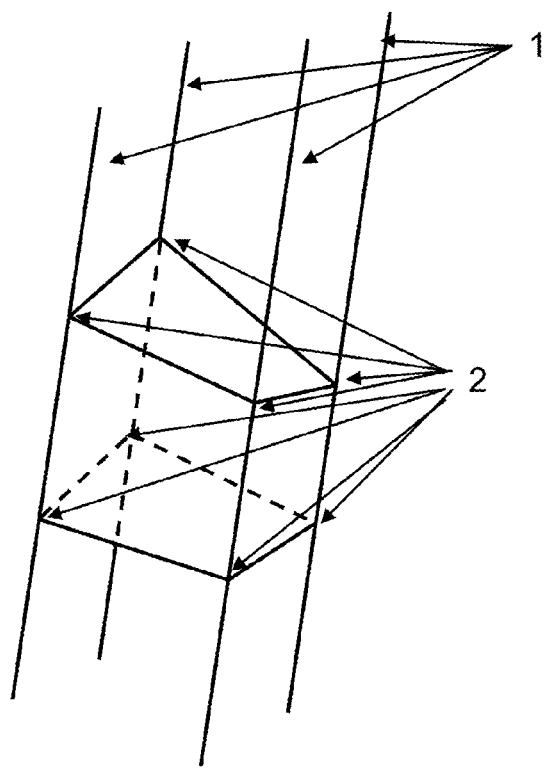
FIG. 2a is a schematic showing the construction of a 3-d corner point grid.
Figure 2B:
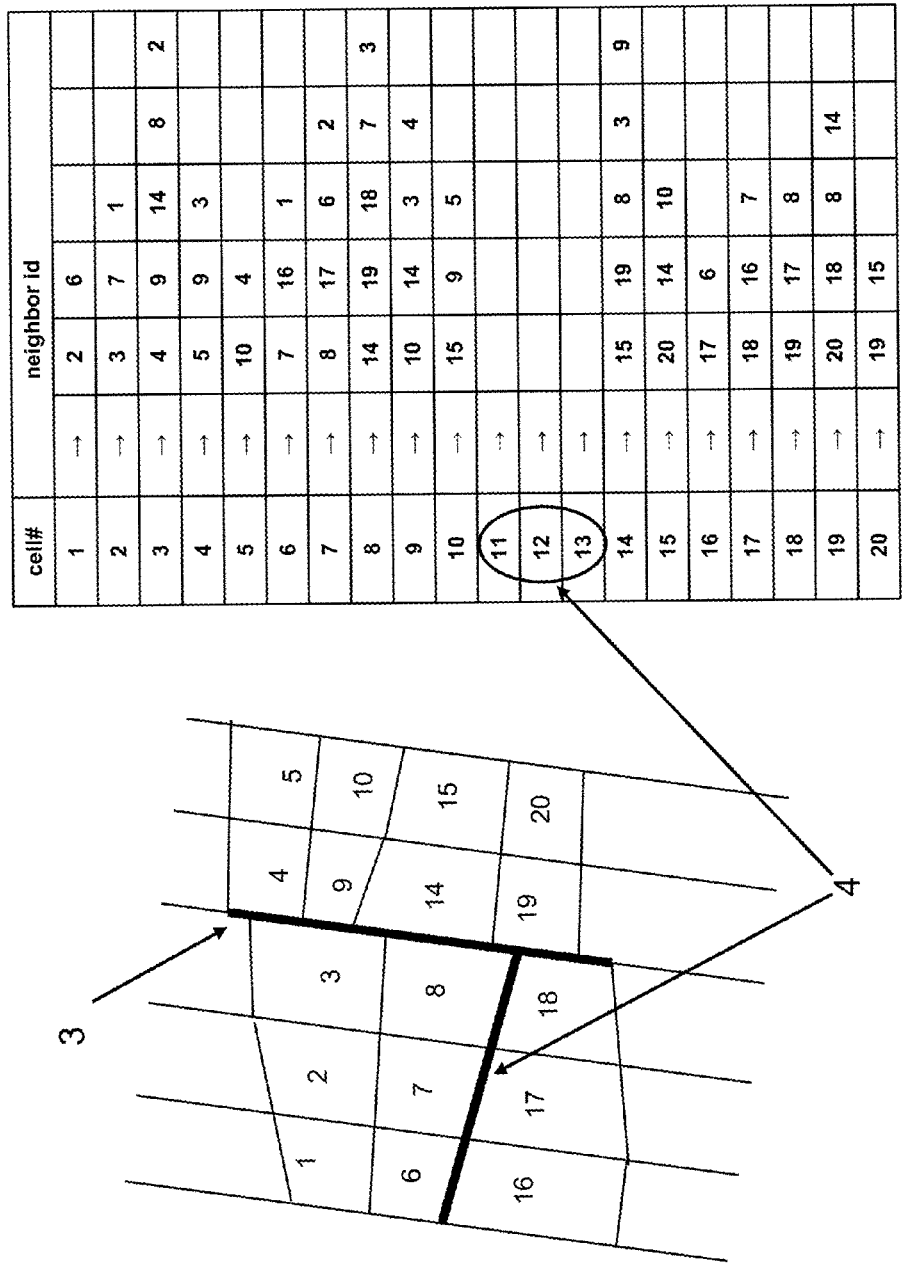
FIG. 2b is a schematic showing neighbor connection types in a 2-d corner point grid and corresponding table of neighbor cells.
Figure 3:
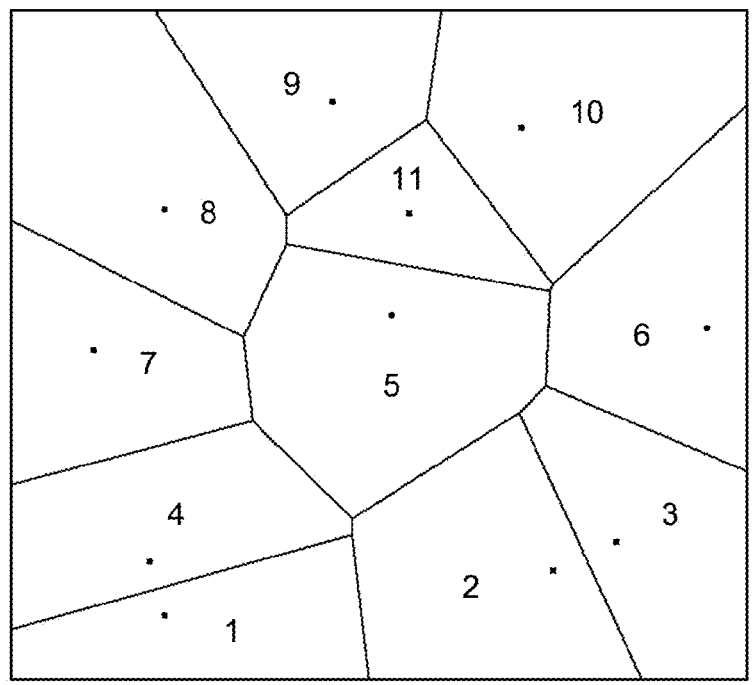
FIG. 3 is a schematic showing the neighbor connection types in an unstructured grid.

The invention is not limited to a 3-d Cartesian grid, however. The invention can be applied to any type of grid provided that for each cell a list of neighboring cells can be generated. Other types of grid include a corner point grid (FIG. 2) and an unstructured grid (FIG. 3). These grid types are well known in this field of art. In each case, the neighboring cells for any given cell can be generated easily.

The following description is based on a Cartesian grid since this is the simplest type. Consider a general property P in a 3D Cartesian grid G, which can be either a continuous array such as porosity ($\phi$) or permeability (K), or a categorical array such as lithofacies f. A region index property R can be associated with that property P to identify the sub-domain of interest, which is also known as the active region in geological modeling. Given some threshold value(s), property P can be converted into an indicator property ("flag") as PI: value zero indicating the background or inactive area, and value one showing the foreground that consists of the potential geobody elements. When two adjacent cells have the same value one, they are defined as connected neighbors, belonging to the same geobody.

Given any active location u in grid G, its adjacent cells can be found through a pre-defined neighborhood window W(u), which is essentially a collection of the relative offset vectors $\{h_i=(x, y, z)_i, i=1, \ldots, N_w\}$ from the center cell u. The offset coordinate x/y/z is an integer value; it can be any of the three values '1', '0' and '−1'. $N_w$ is the total number of cells in window W(u). The adjacent cells of u are then defined as $\{u+h_i, i=1, \ldots, N_w\}$. The algorithm discussed below takes any non-empty combination of the three cell connection types (face, edge and point) in FIG. 1 to define a valid window W(u). For example given the face connection type, in 3D six offset vectors are defined as: (1, 0, 0), (−1, 0, 0), (0, 1, 0), (0, −1, 0), (0, 0, 1) and (0, 0, −1); while in a 2D grid, only 4 offset vectors are defined, depending on the 2D plane definition. This neighborhood window concept will only return the adjacent cells within the given grid G.

The geobody calculation algorithm scans the 3D array PI from the first cell to the last until all the cells in grid G are visited. If a cell u has value '1' and does not belong to any known geobody, then it is assigned a unique id gi. The process is as follows. Starting from the cell u:

(1) define a queue data structure (Q) to record all potential cells to be processed for geobody search (a queue is a 'first in first out' data structure: new elements are always appended at the end of the queue; and the element on the top is always removed from the queue first);

(2) add into Q all u's neighboring cells that are connected to geobody gi through window W(u);

(3) pop out the first element, indicated as v, from the queue Q (now v is removed from Q hence the length of Q is decreased by 1);

(4) find all v's neighboring cells connected to geobody gi and add them into Q;

(5) repeat steps (3) and (4) until Q is empty.

The global scanning process guarantees that all the geobodies in the grid can be found and indicated by a unique id. The use of the neighbor window function W(u) conveniently takes into account the borders of the grid G: if for any given vector from u a valid cell is not found, then no cell v is added to the queue. No separate function identifying the borders of the grid G is required.

Using a different type of grid, such as corner point or unstructured, the same process based on a neighborhood window can be used. For these other types of grid, the neighborhood window will be defined differently. For example, for a corner point geometry grid, a neighboring cell list is created by comparing the cell coordinates. FIG. 2a shows the construction of a corner point grid, where the coordinates 2 of any given cell are figures representing the depth, or distance along, a number of parallel coordinate lines 1. FIG. 2b shows a 2-d corner point grid including some discontinuous features: a fault line 3 and a region of zero thickness cells 4; even with a grid with features like this, calculation of the neighbors is straightforward, as shown. For an unstructured grid (see FIG. 3), the adjacent cell list already exists since it is part of the original definition of the grid.

During geobody calculation, the algorithm simply loops from the first cell to the last cell in the neighbor list in step 5 of Algorithm 3 (see below).

A 3D property is generated to map all the geobodies with unique non-negative integers. Any integer numbers may be used as the geobody indicator; however non-negative integers are more convenient for programming. The same applies to all the use of non-negative integers in this description.

Some other useful information such as the total number of geobodies, the total number of geobody cells, the largest geobody and its size, and the reservoir geobody connectivity measurement are exported.

Given any geobody i with $V_i$ number of cells, each cell in that geobody can be connected to the rest of $V_i-1$ cells either directly or through other cells. Hence the total number of cell pairs which are connected is $V_i*(V_i-1)/2$. Then the geobody connectivity measure, also known as the probability of having two cells connected within the same geobody, is defined as $$\text{reservoir geobody connectivity} = \frac{\sum_{i=0}^{n}(V_i*(V_i-1)/2)}{\left(\sum_{i=0}^{n}V_i\right)*\left(\sum_{i=0}^{n}V_i-1\right)/2}$$

$$= \frac{\sum_{i=0}^{n}V_i^2 - \sum_{i=0}^{n}V_i}{\left(\sum_{i=0}^{n}V_i\right)^2 - \sum_{i=0}^{n}V_i}$$

$$= \frac{\sum_{i=0}^{n}V_i * \frac{\sum_{i=0}^{n}V_i^2}{\left(\sum_{i=0}^{n}V_i\right)^2} - 1}{\sum_{i=0}^{n}V_i - 1}$$

$$\approx \frac{\sum_{i=0}^{n}V_i^2}{\left(\sum_{i=0}^{n}V_i\right)^2},$$

where n is the total number of geobodies. Note that, in real applications the model could contain several thousands or millions of cells, hence $\sum_{i=0}^{n}V_i \gg 1$.

The detailed geobody calculation algorithm is summarized in Algorithm 1 (see below). The algorithm may, for example, be implemented as a plugin program (geobody) for Stanford Geostatistical Modeling Software (SGeMS), which is free, open source 3D geostatistical modeling software (available at http://sgems.sourceforge.net).

Although Algorithm 1 uses the queue data structure, the stack data structure can be used as an alternative. A stack is a 'last in first out' data structure: new elements are always appended at the top of the stack; and the element on the top is always removed from the stack first.

When the well hard data are provided, a post-processing routine will be performed to distinguish all the geobodies connected to wells. Given $n_w$ number of geobodies that are connected to wells, the reservoir-to-well connectivity is simply defined as:

$$\text{reservoir-to-well connectivity} = \frac{\sum_{j=0}^{n_w}V_j^w}{\sum_{i=0}^{n}V_i},$$

where $V_j^w$ is the number of cells in geobody j which is connected to well perforations.

Both the connectivity measures could be used as major parameters to rank multiple geological realizations.

---
Algorithm 1 - Geobody calculation
---

1: convert the input property P into an indicator property PI
2: define neighborhood geometry W(u), see Algorithm 2
3: initialize geobody indices (gi) as not informed
4: for each cell u in the grid G do
5:     if PI(u) > 0, and has not been assigned a geobody index then
6:         assign a unique geobody index gi to cell u and its connected neighbors, see details in Algorithm 3
7:         increase geobody index by one (gi = gi + 1)
8:     end if
9: end for ---
Algorithm 2 - Generate neighborhood geometry
---

1: get selected cell connectivity options
2: for all requested options do
3:     add valid neighboring cell offset vectors into W(u)
4: end for
5: if W(u) is empty then

| Algorithm 2 - Generate neighborhood geometry |
|---|
| 6:     abort geobody calculation |
| 7: end if |

| Algorithm 3 -3 Search for connected neighboring cells |
|---|
| 1: generate an empty queue Q to store cell locations |
| 2: push u into Q |
| 3: while Q is not empty do |
| 4:     pop a cell v from Q |
| 5:     for each neighboring cell w of v within W(v) do |
| 6:       if w is a valid cell, has no geobody index, and PI(w) = PI(u) then |
| 7:         assign u's geobody index to w |
| 8:         push w into Q |
| 9:       end if |
| 10:    end for |
| 11: end while |

In practice, there might be multiple wells associated with any given model. In this case, the user can generate a well indicator property by assigning each well with a unique non-negative integer. For example, all the cells belonging to well 'A' have value '1', and all the well 'B' cells have value '2', etc. It is then possible to use that indicator property to find all the geobodies connected to each individual well. In addition, all the well pairs which are connected through each individual geobody are identified.

If a well has multiple perforation zones, then one can assign different non-negative integer to each individual perforation segment. By doing so, this invention will identify the well segment pairs that are connected through certain geobody or geobodies.

Figure 4:
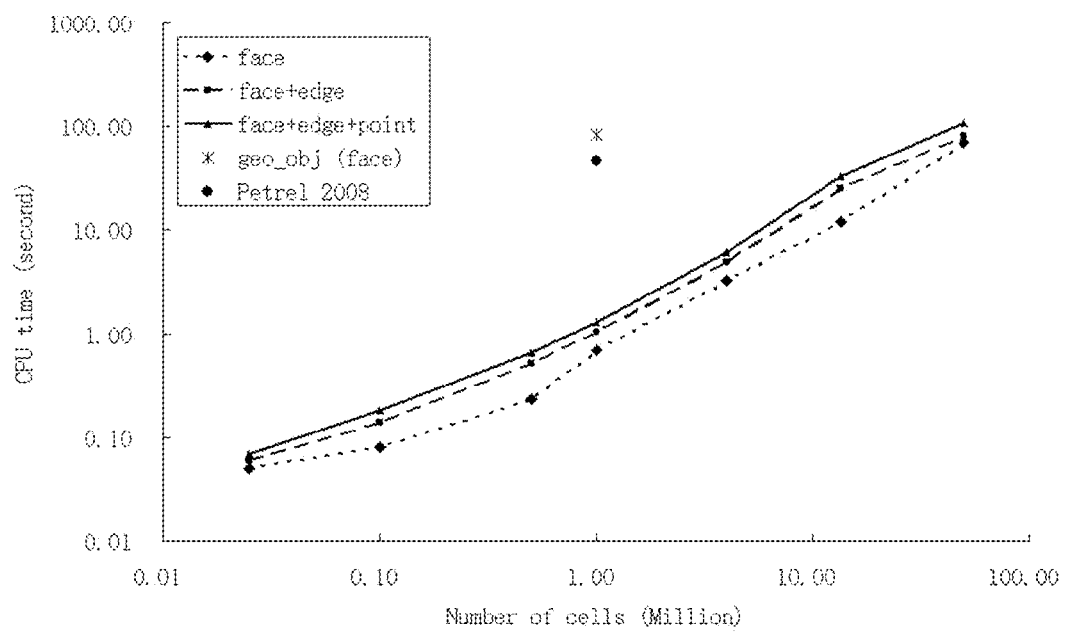
FIG. 4 is a comparison of CPU time versus model size using the method of the invention and using the prior art.

This geobody algorithm according to the invention is both CPU and RAM (Random Access Memory) efficient. FIG. 4 compares the CPU time versus geological model size in an IBM® T40 laptop (1.3 GHz processor and 768 M memory). The working property is generated with SISIM (Sequential Indication SIMulation) algorithm with 0.55 for the background proportion and 0.45 for the foreground proportion. For details of the SISIM algorithm, see P. Goovaerts: "Comparative performance of indicator algorithms for modeling conditional probability distribution functions," *Mathematical Geology*, v. 26 (1994) p. 389; see also N. Remy, A. Boucher and J. Wu: "Applied Geostatistics with SGeMS: A User's Guide" (Cambridge University Press). As seen from FIG. 4, the total CPU time of the geobody algorithm is a linear function of the model size, and as expected the CPU time increases when add the edge and point connection options. For a one million cells model, the CPU time with face connection type is only 0.68 seconds with geobody program, while the geo_obj program (Deutsch—see above) takes 82 seconds and the Petrel® 2008 utility function takes 46 seconds. When the model size is increased to 50 million, it only takes 70 seconds in the same IBM® laptop, while both geo_obj program and Petrel® 2008 utility function failed (even in a Dell® desktop with 3G RAM and 3 GHz processors).

Example 1

Figure 5A:
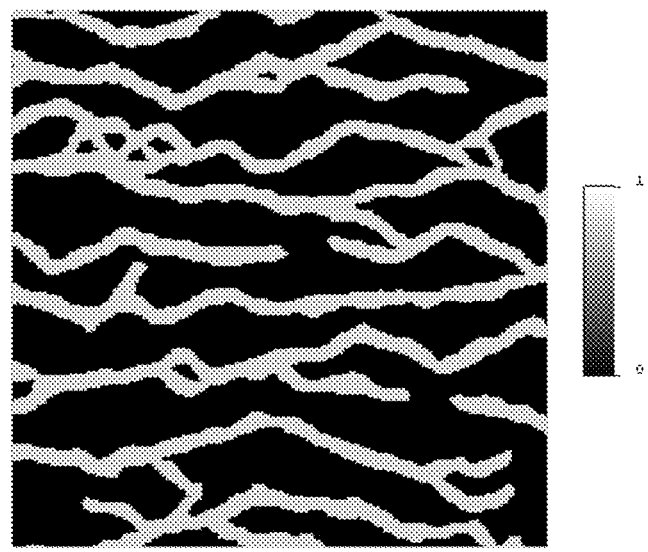
FIGS. 5a and 5b are illustrations of a 2-d model showing geobodies and wells according to Example 1.

FIG. 5a shows the facies distribution of a 2D two facies channel reservoir of size 250 by 250, which is generated using the SNESIM (Single Normal Equation SIMulation) algorithm (Remy et al., 2009; S. Strebelle, 2000: "Sequential simulation drawing structures from training images," PhD thesis, Stanford University, Stanford, Calif., USA).

Figure 5B:
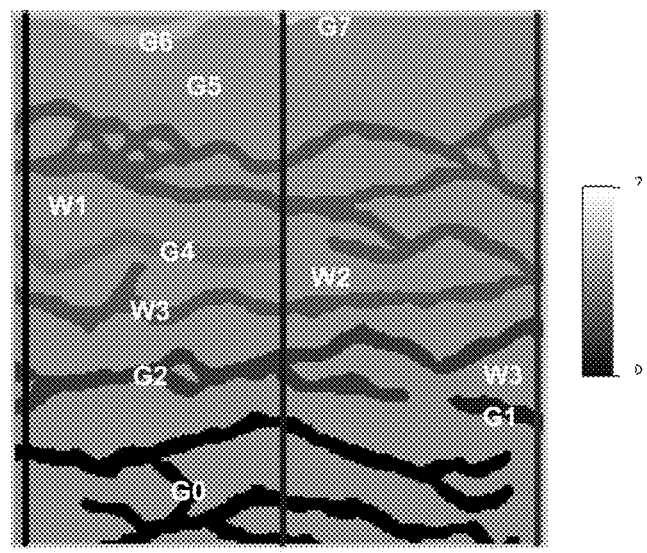

The channel facies (sand) has value one, shown darker gray, with proportion 0.72 and the background facies has value zero, shown in light gray. Three wells, W1, W2 and W3, are located to the left edge, in the middle and to right edge of the field, respectively (see FIG. 5b). The geobody program is performed with the minimum geobody size 10, using face connection option. Eight qualified geobodies are found and displayed—see references G0 to G7 in FIG. 5b. The small portion of the sandy cells in the lower left hand corner of FIG. 3a is not accepted as a qualified geobody, because its total number of cells is only nine, which is less than ten.

The numerical output from the geobody program for Example 1 is shown below:
Total number of geobodies is 8
Total number of geobody cells is 19567
Reservoir geobody connectivity is 0.24051
The largest geobody's id is 3
The number of cells is 7493
Its proportion to total geobody cells is 0.382941
Geobodies connected to wells are G0 G1 G2 G3 G4 G5 G6 G7
Total number of geobody cells connected to wells is 19567
Reservoir-to-well connectivity is 1
Well #W1 has 19099 connected cells, through geobody id G0 G2 G3 G4 G5 G6
Well #W2 has 18574 connected cells, through geobody id G0 G2 G3 G4 G5 G7
Well #W3 has 13491 connected cells, through geobody id G1 G2 G3 G5
well #W1 connects well #W2 through geobody id G0 G2 G3 G4 G5
well #W1 connects well #W3 through geobody id G2 G3 G5
well #W2 connects well #W3 through geobody id G2 G3 G5

Example 2

Figure 6A:
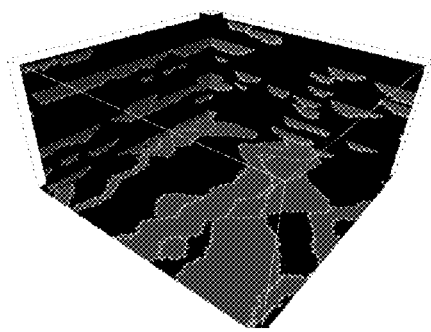
FIGS. 6a to 6d are illustrations of a 3-d model showing geobodies and wells according to Example 2.
Figure 6B:
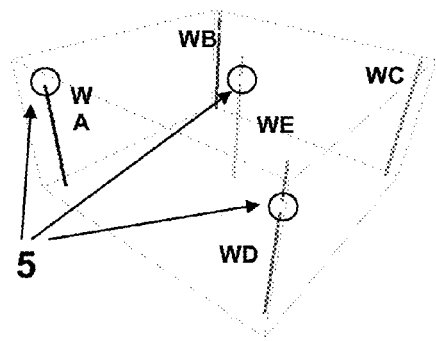
Figure 6C:
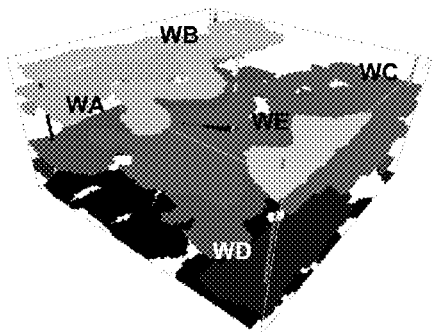
Figure 6D:
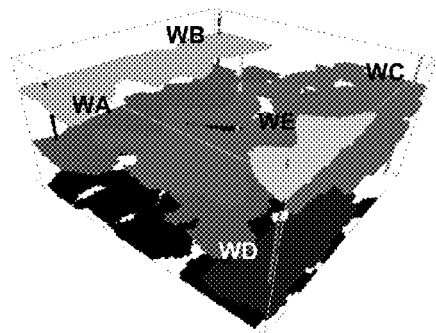

FIG. 6a illustrates a three facies channel reservoir in a 3D grid of size 100 by 100 by 50. Its facies distribution is generated with the object-based program 'fluvsim' (Deutsch and Tran: "Fluvism: a program for object-based stochastic modeling of fluvial depositional system," Computers & Geosciences, 28(4) (2002), 525-535), with one background facies, one sand channel facies and one sand levee facies. The facies proportions are 0.8, 0.13 and 0.07, respectively. The geobody elements will include both the sand facies (channel+levee). FIG. 6b shows a five-spot well pattern for the field development strategy; the wells are labeled WA to WE. Notice the wells have non-informed locations 5. FIG. 6c shows all 18 geobodies, and the reservoir connectivity is 0.199636. FIG. 6d gives six geobodies which are connected to wells, representing 90.2958% of total sand cells.

The geobody plugin software and method described above is not limited to geological modeling. It can also be used, for instance, in the mining area to identify mineral clusters with good quality, in environmental studies to locate polluted spots.

What is claimed is:

1. A method for calculating at least one theoretically connected region within a 3-d model, wherein the model comprises a plurality of cells, each cell associated with a value of at least one property, the method comprising the steps of:
   a) For each cell of the model, determining, using a computer, whether the value of the at least one property meets at least one threshold criterion and flagging the cell as met if the cell meets the threshold criterion;

a1) Assigning, using the computer, one of the flagged cells to a geobody by assigning it a geobody identifier value of 1;
a2) For the assigned cell having the assigned geobody identifier value, creating in the computer, a temporary data store to store all potential neighboring flagged cells;
a3) Identifying, using the computer, each neighboring cell of the assigned cell through a specified neighborhood window and for each identified neighboring cell:
   determining if the neighboring cell has been flagged as met and if so and if the neighboring cell has not yet been assigned a geobody identifier value:
   identifying it as connected to the geobody of the assigned cell and setting its geobody identifier value same as that of the assigned cell;
   adding the neighboring cell to the end of the temporary data store;
a4) Removing the top flagged cell from the temporary data store and treating it as the assigned cell;
a5) Repeating step a2) to a4) for each flagged cell that remains in the temporary data store until the temporary data store is empty;
b) Checking, using the computer, each flagged cell of the model to determine if it has not yet been assigned a geobody identifier value and if so, assigning a geobody by assigning a next geobody identifier value to the unassigned cell and performing steps a2), a3), a4) and a5); and
e) Repeating step b) until all flagged cells in the model have been assigned a geobody identifier value.

2. The method according to claim 1 wherein said at least one connected region is a geobody and said model represents a subterranean hydrocarbon reservoir.

3. The method according to claim 2 wherein the model includes a well and one or more cells of said model are perforated by said well, the method further comprising assigning a first unique well identifier to said cell or cells which are perforated by said well and determining which geobodies are connected to said well.

4. The method according to claim 3 wherein the model includes at least one further well and one or more cells are perforated by said at least one further well, the method comprising assigning one or more further unique well identifiers to said further well or wells and determining wells which are connected together via the geobodies.

5. The method according to claim 1 wherein said temporary store has a queue data structure.

6. The method according to claim 1 wherein said temporary store has a stack data structure.

7. The method according to claim 1 wherein the 3-d model comprises a Cartesian grid of volume cells.

8. The method according to claim 1 wherein the 3-d model comprises a corner point grid of volume cells.

9. The method according to claim 1 wherein the 3-d model comprises an unstructured grid of volume cells.

10. The method according to claim 7 or 8 or 9 wherein said volume cells have coordinates and wherein no data other than said coordinates of said volume cells is required for calculation of geobodies which abut a boundary of the model.

* * * * *